Sept. 13, 1966 G. J. TOPOL 3,271,998

DEVICE FOR IMPROVING DETECTION OF CONTAMINANTS

Filed May 6, 1963

INVENTOR.
GEORGE J. TOPOL
BY Albert L. Jeffers
ATTORNEY

Sept. 13, 1966 G. J. TOPOL 3,271,998

DEVICE FOR IMPROVING DETECTION OF CONTAMINANTS

Filed May 6, 1963 2 Sheets-Sheet 2

INVENTOR.
GEORGE J. TOPOL

BY Albert L. Jeffers
ATTORNEY 3,271,998
Patented Sept. 13, 1966

3,271,998

DEVICE FOR IMPROVING DETECTION OF CONTAMINANTS

George J. Topol, Hamilton, Ontario, Canada, assignor to Bowser, Inc., Cookeville, Tenn., a corporation of Indiana Filed May 6, 1963, Ser. No. 278,351
3 Claims. (Cl. 73—53)

This invention relates to a device which is usable for improving the detection and measurement of contaminants by improving the degree of dispersion of such contaminants within the fuel or other liquid being monitored.

There are a number of proposed detection-and-measuring devices for monitoring the amount of contamination which exists within a fluid medium. One application of such measurement and detection is in the field of fuels which are used in powering aircraft engines. Since it is important that the fuels be as free as possible from water and other contaminants, it is necessary to provide a reliable and adequate measuring and detecting system which accurately and continuously provides information on the condition of the fuel at the time it is conveyed to the aircraft.

One of the measuring devices which has proved successful in detecting a wide range of contaminants, including liquid phase contaminants, is disclosed and fully described in copending application Serial No. 152,892, filed Nov. 16, 1961 and titled Instrument and Process for Testing Contamination in Liquid Materials. This application is based on the principle of measuring the amount of reflected light which is received by a photocell from dispersed contaminants within the fuel or other liquid being measured, the photocell being effectively shielded from all other light than such reflected light. It is an important characteristic of this measuring device that it is highly sensitive, can be calibrated with precision, and in the event of malfunction this fact is readily made known to the operator so that necessary adjustments can be quickly and easily effected. The principle of the device, sometimes referred to as a "TOTAMITOR" is that the contaminants must be effectively dispersed substantially uniformly throughout the fuel or other liquid being measured for its degree of contamination. If substantially complete dispersion is not obtained, the "TOTAMITOR" will not provide a reliable detection of the degree of contamination.

Accordingly, one of the principal objects of the present invention is to provide a new and improved device which will, with minimum power consumption, effect a substantially complete and uniform dispersion of any contaminants within a liquid in order to obtain a more reliable operation of a contamination-detecting-and-measuring apparatus.

It is a further object of the present invention to provide a contamination-dispersing means which is readily combinable with a fluid flow system capable of dispersing the contaminants within the entire flow of fluid under test. In the present invention, the test results are more direct and more reliable since the entirety of the fluid is tested rather than merely a sampling thereof.

A further object of the present invention is to achieve, by reason of a fine dispersion of contaminants, a uniform response of the testing apparatus to such dispersion and which is calibrated to provide an accurate evaluation of the degree of purity of the liquid. By avoiding coarsely dispersed contaminants which are less detectable, there is susbtituted, therefor, a uniform fine dispersion which gives a higher reading and a reading which is consistently directly proportioned to contamination.

A further object of the invention is to provide a dispersion-producing device which will effect a constant degree of dispersion independently of flow rate and which, therefore, will provide the sensing-and-measuring device with a reliable reading of the degree of contamination regardless of the flow rate.

It forms an important feature of the present invention that the disperser does not require a motor drive or other mechanical drive but instead can be simply added to the flow distributing system.

Other objects and features of the invention will become apparent from a consideration of the following description which proceeds with reference to the accompanying drawings, wherein.

Figure 1:
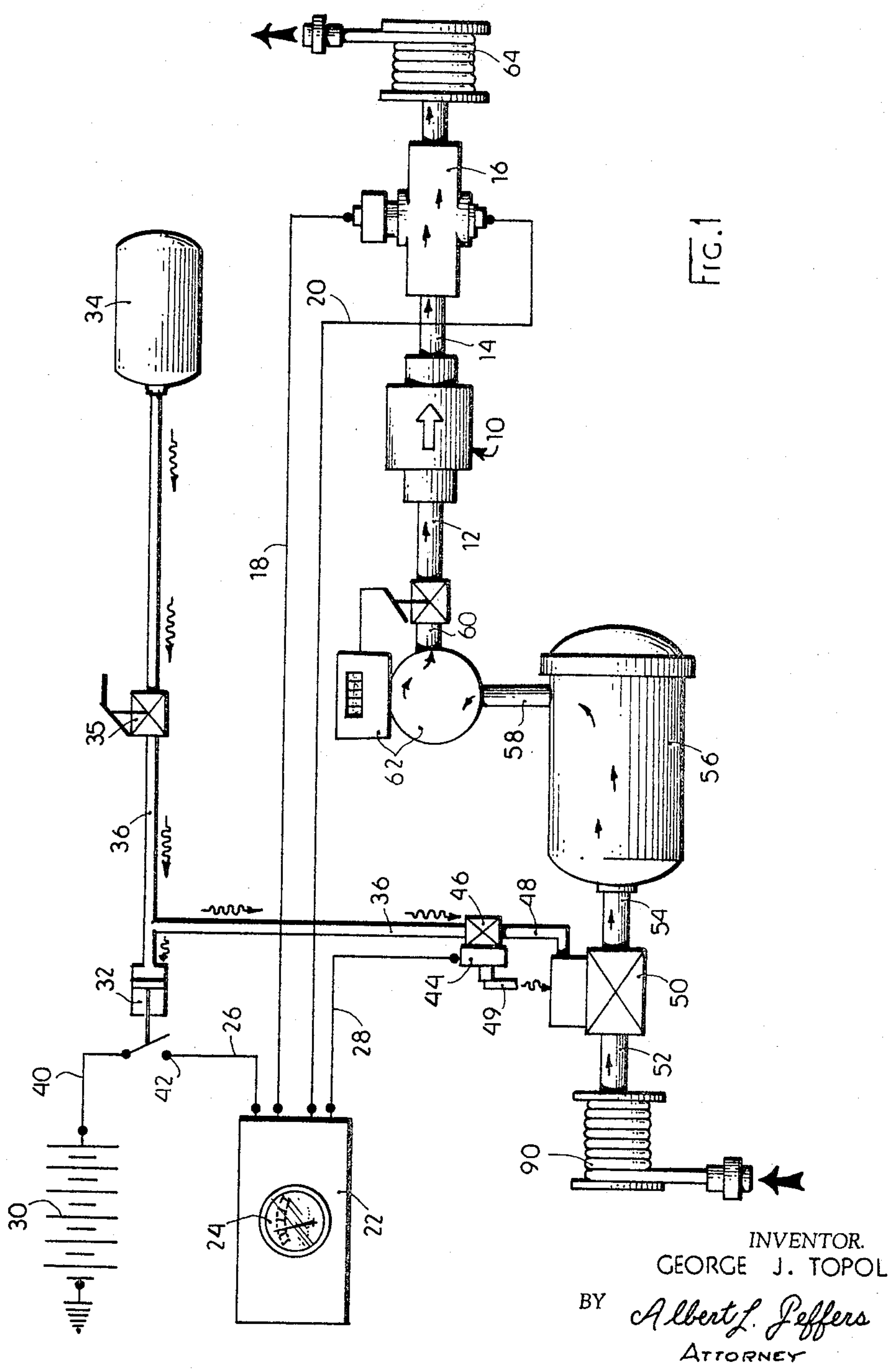
FIGURE 1 is a flow diagram illustrating how the invention is combined with a flow distributing system and measuring apparatus.

Referring now to the drawings, there is shown in FIGURE 1 a disperser, designated generally by reference numeral 10, which is located in series connection with supply line 12 so that all of the fuel (or other fluid being measured) will pass through the disperser 10 in line 12 and then from line 14 to a contamination-sensing-and-measuring device 16 having electrical connections through conductors 18, 20 with an amplifier 22 having a suitable gauge 24.

The turbidity amplifier 22 is connected with a battery 30 through a conductor 26 having a pressure switch 32 which establishes opening and closing of contacts connecting conductor 26 with conductor 40. As soon as the valve 35 is depressed the pressure switch 32 energizes the amplifier 22 and the device 16. A light in the device 16 will be illuminated by power supplied through line 18 and the photo cell signal is supplied to the amplifier 22 via line 20. As long as the fuel flowing through the device 16 is clean the relay inside of the amplifier 22 keeps the valve 46 opened by keeping its coil 44 energized through line 28. Should contamination occur in the fuel the relay in the amplifier 22 will de-energize line 28 and solenoid 44 causing the valve 46 to close. The valve 46 is a three-way valve and when de-energized line 48 communicates with line 49. As a result, pressure below the diaphragm keeping the shut-off valve 50 open will be released to the atmosphere and the valve 50 will shut-off the flow of fuel.

To enable delivery of the fuel two conditions must be met; first the dead man valve 35 must be opened; this through closing the contacts 42 will put the device 16 in operation. The valve 46 has to be opened to permit the pressure from the tank 34 to communicate through line 36 and 48 with valve 50 and thus to open valve 46. Manual closing of valve 35 or automatic closing of the solenoid valve 49 result in stoppage of flow of fuel through the system.

The disperser and the device 16 is located between the meter 62 and the hose-reel 64 so that the instrument will monitor the fuel as it is delivered rather than monitoring its cleanliness before the separator 56.

The principle on which the device 16 is based is that the degree of contamination is directly related to the amount of contamination which is sensed by a photocell otherwise shielded from all other light, the degree of light sensed being a function of the number of dispersed particles. Accordingly, since one large aggregate of contaminant would give a lower measurement than the same contaminant in the form of a plurality of smaller ones, it is necessary to obtaining a reliable measure of contamination to convert coarse dispersed contaminants into a fine dispersion uniformly distributed throughout the flow and provide thereby a reading of contamination which is consistent over a wide range of flow rates for the liquid being measured. In this way, the degree of contamination which is registered by the device 16 will be related to the absolute amount of contamination and will be unaffected by the size or initial distribution of the contaminants and is also unaffected by fluid flow.

To effect a conversion of the contaminants to suitable size and distribution, the disperser 10 receives the entire flow from line 12 and before discharging it to line 14 effects the dispersion as required. The disperser 10 does not require any external power and it provides its necessary function with only negligible power requirement. That is, only a slight pressure drop occurs across the disperser 10 to obtain dispersing action substantially uniformly over a wide range of flow rates in line 12.

The line 12 (FIGURE 2) has a plurality of orifices 70 which permit the fluid to flow from line 12 in radial directions as indicated by arrows 72 into an annular space 74 provided by a sleeve 76 which surrounds line 12 and is connected integrally with line 14. Within the end of the line 12 is mounted a fluid pressure responsive piston 78 which is biased by a spring 80 in a direction tending to oppose the pressure effecting fluid flow in line 12 and indicated by arrows 82 so that the piston 78 normally moves in a direction covering the orifices 70 but, the face 84 of the piston being exposed to the pressure in line 12 causes the piston to be biased leftwardly against the resistance of spring 80 by an amount proportional to the fuel flow rate in line 12.

Figure 2:
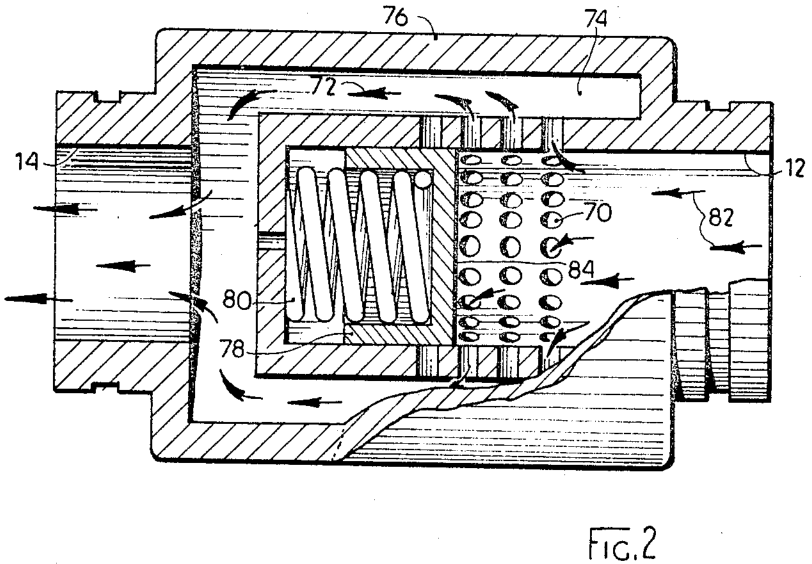
FIGURE 2 is an enlarged sectional view of the invention, shown detached from the rest of the system and illustrating the direction of flows; and, FIGURE 3 illustrates how the present invention by producing a uniform dispersion contaminants causes the sensing apparatus to be relatively unaffected by change in flow rate of the liquid undergoing test.

Thus, the piston 78 is moved to the right at low flow rate and to the left of the position shown in FIGURE 2 for high flow rate to uncover additional orifices 70 whereby there is minimum pressure drop for the fluid in passing from line 12 to line 14.

Any contaminants in the form of suspended free water droplets tend to be broken up into uniform sizes on passing through the orifices 70 and by virtue of the number and placement of the orifices, such contaminants will be distributed substantially evenly throughout the line 14 so that when the contaminants reach device 16, the degree of dispersed light will be directly related to the degree of contamination and such factors as contamination size and distribution will not conduce to an erroneous reading provided by the instrument 16. Instead, the reading will be accurately related to the degree of contamination, independently of the nature of the contaminant, its size and initial distribution. Moreover, the reading provided by the instrument as to the purity of the liquid will remain the same regardless of the flow rate of the fuel or other liquid which passes through the instrument.

Figure 3:
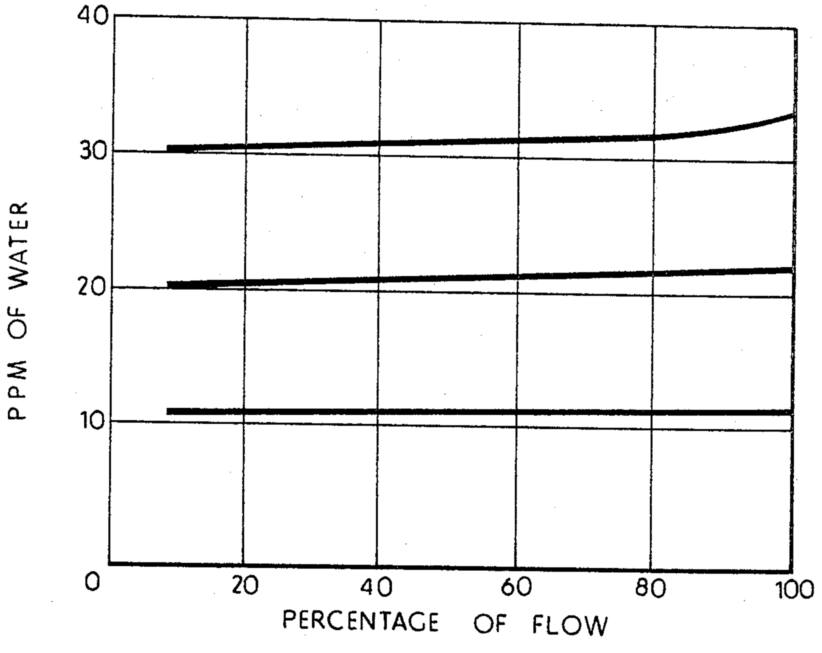

Referring to FIGURE 3, there is shown there three different levels of contamination, and how the contamination-sensing device is relatively unaffected by the flow rate. That is, for the same degree of contamination, there is only a negligible change in contamination reading by varying the flow rate. This means, that such parameters as flow rate, size of contaminants and distribution are not conducive to falsified instrument readings as to the degree of purity.

Furthermore, the total amount of liquid such as fuel and the like, is passed through the sensing instrument and therefore inaccurate readings are avoided, which sometimes arise by an attempt to sample representative portions of the fuel, this method lending itself to error because the sample is not always truly representative.

In operation, the device 10 is coupled between sections 12 and 14 prior to the fluid reaching instrument 16 so that the total flow of fluid is first passed through the disperser and the contaminants formed into a uniform dispersion evenly distributed throughout the liquid by virtue of the orifices 70 which direct the flow from longitudinal flow to a radial flow through a plurality of the orifices, and are then mixed within annular space 74. The flow is then combined within a passage 14. Since the number of uncovered openings 70 which provide for radial flow, is directly proportional to pressure in line 12, there is a constant pressure drop across the device 10 regardless of the flow rate. There is no requirement for power operated dispersing means and the device 10 operates responsively to pressure and provides automatically an appropriate dispersion effect so that the instrument 16 is best capable of providing an accurate and constant recording of contamination.

In all other respects, the operation of the instrument 16 is the same as described in my previously filed copending application, cited hereinbefore. Operation of the measuring device 16 is enhanced by the device 10 which adapts the contaminants to a more detectable and uniform condition for recording. The disperser describes consumes very little power and can be added very economically and enhances the accuracy and calibration of the instrument 16. Therefore fluids can be more accurately monitored and corrective action taken before the level of contamination can produce untoward results.

The equipment is carried on a cart and the hose 90 secured to a hydrant (not shown) and the operation commences as described to deliver fuel to an aircraft or other vehicle through line 64 until the apparatus detects a contaminated condition of the fuel and will terminate the operation.

Although the present invention has been illustrated and described in connection with a single example embodiment, it will be understood that this is illustrative and is in no sense restrictive thereof. It is reasonably to be expected that those skilled in the art can make numerous revisions and adaptations of the invention to suit individual design requirements and it is intended that such revisions and adaptations which incorporate the principles disclosed herein, will be included within the scope of the following claims as equivalents of the invention.

I claim:

1. A device adapted to effect a substantially uniform dispersion of water in a system for testing for such contaminants, comprising:

(a) means having a plurality of individually formed openings which are spaced therein for conveying a quantity of fluid;

(b) fluid pressure-responsive piston-valve means having orifice control surfaces adapted to cover and uncover said openings which are constructed to provide a cumulative area defining the effective total orifice opening through which fluid is passed from said conveying means into said chamber;

(c) means for biasing said fluid pressure-responsive means in a direction which tends to reduce the number of uncovered orifices, said pressure-responsive means being movable to increase the number of available orifice openings defining the effective orifice area to maintain a substantially constant pressure differential regardless of the degree of flow;

(d) and contaminant measuring means for receiving the flow of fluid after it has passed through said orifices to become substantially completely dispersed in said flow.

2. A device adapted to effect a substantially uniform dispersion of contaminants in a system for testing for such contaminants, comprising:

(a) means having a plurality of individually spaced openings therein for conveying a quantity of fluid;

(b) a chamber surrounding the end of said conveying means;

(c) fluid pressure-responsive means having orifice-control surfaces which overlie said spaced openings adapted for defining the effective outlet orifice for the fluid conveyed through said conveying means;

(d) means for biasing said fluid pressure-responsive means in a direction which tends to reduce the number of available openings and thereby restrict said orifices, said pressure-responsive means being movable to increase the available number of openings and thereby increase the effective orifice area to maintain a substantially constant pressure differential regardless of the degree of flow;

(e) and contaminant measuring means for receiving the flow of fluid after it has passed through said orifices to become substantially completely dispersed in said flow.

3. A device adapted to effect a substantially uniform dispersion of contaminants in a system for testing for such contaminants, comprising:

(a) means having a plurality of spaced openings therein for conveying a quantity of fluid;

(b) a chamber surrounding the end of said conveying means;

(c) fluid pressure-responsive means having orifice-control surfaces adapted to cover and uncover said openings which define the outlet orifices through which fluid is passed from said conveying means into said chamber;

(d) resilient yieldable means for biasing said fluid pressure-responsive means in a direction which tends to restrict the number of openings which are spaced in said conveying means and thereby control the effective size of said orifices, said pressure-responsive means being movable to increase the effective orifice area to maintain a substantially constant pressure differential regardless of the degree of flow;

(e) contaminant measuring means for receiving the flow of fluid after it has passed through said orifices to become substantially completely dispersed in said flow;

(f) and means for delivering the fluid to be tested from said chamber to said measuring means.

References Cited by the Examiner

UNITED STATES PATENTS

| | | | |
|---|---|---|---|
| 1,846,577 | 2/1932 | Barber | 137—538 X |
| 2,571,470 | 10/1951 | Milligan | 73—53 |
| 2,826,216 | 3/1958 | Thomas | 137—538 |
| 3,111,839 | 11/1963 | Evans et al. | 73—61 |

DAVID SCHONBERG, *Primary Examiner.*